US007676492B2

(12) United States Patent
Bodily et al.

(10) Patent No.: US 7,676,492 B2
(45) Date of Patent: Mar. 9, 2010

(54) MIGRATION OF DATABASE USING SERIALIZED OBJECTS

(75) Inventors: Kevin J. Bodily, Frederick, CO (US); Kyle P. Manning, Lafayette, CO (US); Robert C. Nielsen, Longmont, CO (US); Dwight R. Palmer, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/279,051

(22) Filed: Apr. 7, 2006

(65) Prior Publication Data

US 2007/0239774 A1 Oct. 11, 2007

(51) Int. Cl.
*G06F 7/00* (2006.01)

(52) U.S. Cl. .................................. 707/103 R

(58) Field of Classification Search ................. 707/103, 707/101
See application file for complete search history.

(56) References Cited

U.S. PATENT DOCUMENTS

| 5,403,639 | A | * | 4/1995 | Belsan et al. ............... 707/204 |
| 5,832,274 | A | | 11/1998 | Cutler et al. |
| 5,970,490 | A | | 10/1999 | Morgenstern |
| 6,128,621 | A | | 10/2000 | Weisz |
| 6,233,601 | B1 | | 5/2001 | Walsh |
| 6,421,683 | B1 | * | 7/2002 | Lamburt ................... 707/104.1 |
| 6,701,333 | B2 | * | 3/2004 | Suermondt et al. .......... 707/204 |
| 6,985,912 | B2 | * | 1/2006 | Mullins et al. .......... 707/103 R |
| 7,051,042 | B2 | * | 5/2006 | Krishnaprasad et al. ..... 707/102 |
| 7,143,105 | B2 | * | 11/2006 | Nakano et al. ............... 707/102 |
| 7,197,512 | B2 | * | 3/2007 | Pharies et al. ............ 707/103 R |
| 7,290,003 | B1 | * | 10/2007 | Tong ........................... 707/101 |
| 7,293,040 | B2 | * | 11/2007 | Terada ......................... 707/102 |
| 2002/0107871 | A1 | * | 8/2002 | Wyzga et al. ............. 707/104.1 |
| 2002/0138570 | A1 | | 9/2002 | Hickey |
| 2002/0161784 | A1 | * | 10/2002 | Tarenskeen ................. 707/200 |

(Continued)

FOREIGN PATENT DOCUMENTS

JP 2002351710 A 12/2002

OTHER PUBLICATIONS

J. M. Le Goff, H. Stockinger, I. Willers, Object Serialization and Deserialization Using XML, CERN, Geneva, Switzerland Apr. 30, 2001.*

(Continued)

*Primary Examiner*—Luke S. Wassum
*Assistant Examiner*—Mohammed R Uddin
(74) *Attorney, Agent, or Firm*—David W. Victor; Konrad Raynes & Victor LLP

(57) ABSTRACT

Methods, systems, and apparatus for migrating a database of a workflow processing system from a current version to a new version by serializing the data into serialized objects and then deserializing the objects into the new version of the database. The current version of the database may include elements of data associated with base features and extension features of the workflow processing system. The new version of the database is initially generated to include only base features associated with a new version of the programmed instructions of the system. Deserializing the serialized objects into the new version of the database is effective to merge the object types of the information in the current version of the database into the object type of the new version of the database.

25 Claims, 8 Drawing Sheets

U.S. PATENT DOCUMENTS

| | | |
|---|---|---|
| 2003/0018658 A1* | 1/2003 | Suermondt et al. .......... 707/204 |
| 2003/0028555 A1* | 2/2003 | Young et al. ................ 707/204 |
| 2003/0195765 A1* | 10/2003 | Sehgal et al. .................. 705/1 |
| 2004/0122865 A1* | 6/2004 | Stahl et al. ............... 707/104.1 |
| 2004/0249950 A1 | 12/2004 | Christensen et al. |
| 2005/0010919 A1* | 1/2005 | Ramanathan et al. ....... 717/174 |
| 2005/0108627 A1* | 5/2005 | Mireku ...................... 715/513 |
| 2005/0193032 A1* | 9/2005 | Barritz et al. .............. 707/200 |
| 2006/0004686 A1* | 1/2006 | Molnar et al. ................. 707/1 |
| 2006/0184561 A1* | 8/2006 | Terada ........................ 707/102 |
| 2006/0277180 A1* | 12/2006 | Okamoto ....................... 707/7 |
| 2007/0011209 A1* | 1/2007 | Wietlisbach et al. ........ 707/200 |
| 2007/0236708 A1 | 10/2007 | Jahn et al. |

OTHER PUBLICATIONS

Hara, T. et al.; *Database Migration: A New Architecture for Transaction Processing in Broadband Networks*; IEEE Transactions on Knowledge and Data Engineering; vol. 10, No. 5; Sep. 1998.

* cited by examiner

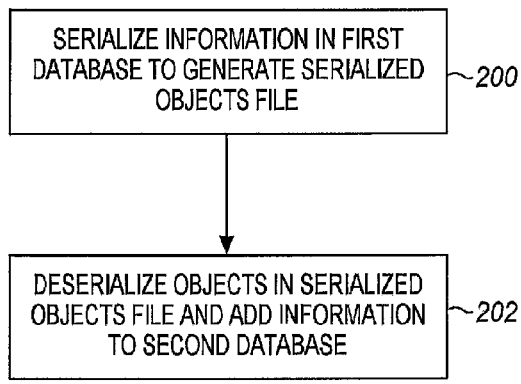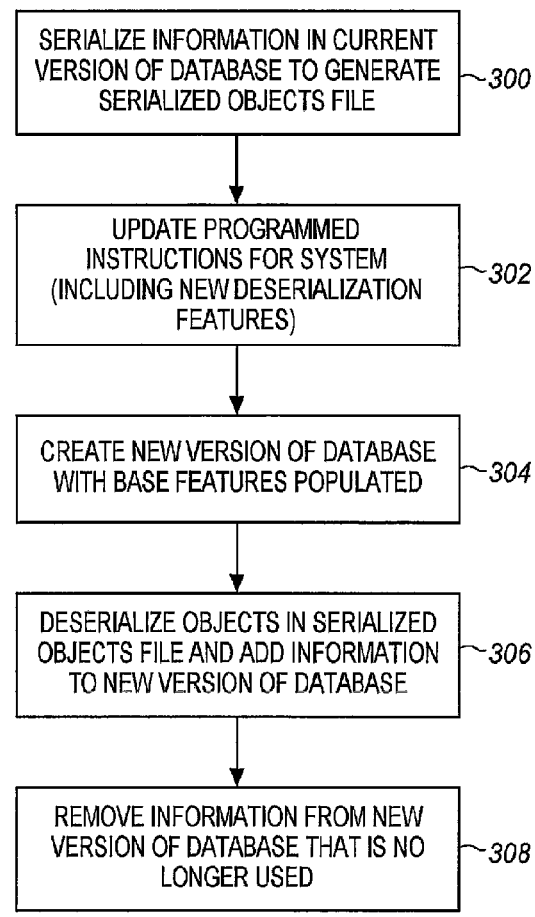

MIGRATION OF DATABASE USING SERIALIZED OBJECTS

BACKGROUND OF THE INVENTION

1. Field of the Invention

The invention relates to the field of migration of data in data processing systems and more specifically relates to use of serializing objects from a first database and deserializing the serialized objects to migrate contents of a database.

2. Related Patents

This patent application is related to U.S. patent application Ser. No. 11/279,052 entitled CUSTOMER-CONFIGURABLE WORKFLOW SYSTEM (hereinafter referred to as the "sibling" application), filed concurrently herewith and hereby incorporated by reference.

Statement of the Problem

In many data processing application systems, an application database is at the heart of the application system's processing. The structure and content of the application database is therefore tightly coupled to the corresponding program instructions of the application system. As used herein, "structure" refers to the table, row and column structure often referred to as a "schema" in many database management products and systems. Frequently, such an integrated database includes structure and information content that is initially generated by the application system, per se, as inherent in the application system's installation. That initial or base structure and information content may then be modified as the application is utilized such that information content and/or structure of the database changes over time. Such modifications may include user specific and/or application specific information the structure and information content of which is determined by ongoing operation of the application system.

It is common in such application systems that updates to the program instructions that implement the application system require corresponding updates to the structure and/or information content of the integrated database. In other words, base features or extended, optional features of the application system may change over time and require corresponding changes in the application database structure and/or information content.

For example in the context of a workflow processing application system, base features of such an application as well as optional extension features may be updated from time to time. Some workflow processing systems utilizes a tightly integrated database for storing information regarding workflow processes as well as particular jobs processed by the workflow processing system. For example, the sibling patent application discloses an exemplary workflow processing system that includes such a tightly integrated database. The database of the sibling patent application therefore has initial data and structure pre-loaded upon its installation and configuration. But, that information content is likely to be modified over time as the workflow processing system is utilized. For example, as the workflow processing system is utilized, various workflow processing models could be altered or further customized and, in particular, information regarding particular jobs processed by the workflow processing system may be added to the database. Thus, over time, the highly integrated database of the workflow processing system is modified from its normal initial state at installation of the application system.

It remains a problem in such application systems to update the integrated database associated with the underlying application system to correspond with updates to the programmed instructions of the application system. Many present day application systems anticipate that a user would unload all data from the integrated database associated with the application system, update the application system program instructions and rebuild a new compliant database. The user then reloads all saved data that may be automatically reloaded. Where the updated version of the database requires structural changes, automated reloading is problematic. Most present day systems simply rely on human operator (manual) processing often requiring significant programming expertise to convert old information stored in the original or current database into appropriately updated new database structures. Such manual processing is substantially more costly than automated processes in that significant specialized expertise may be required. Further, such manual processing is prone to human error as compared to more automated procedures.

It is evident from the above discussion that a need exists for an improved system that allows for more complete automation in migrating an integrated database of an application system from a first or current version to a second or newer version where the migration involves both migration of modified or customized information content as well as modifications or customizations to the underlying structure of the application database.

SUMMARY OF THE SOLUTION

The invention solves the above and other related problems with methods and associated systems and apparatus that provide for more automated migration of an application database in conjunction with updating of related programmed instructions by serializing information content from the first or current version of an application database and deserializing the serialized objects to update a second or newer version of the application database. Thus the serialized information may be migrated to the second database largely independent of changes in the structure of the first database and second database, In one aspect hereof, the information content of the first or current version of the database is serialized to generate a serialized objects file. The serialized objects file is then processed by a deserialization process associated with the updated programmed instructions to populate a second database or new version of the application database. Thus features of the first or current version of the application database are merged with the information content of a second or updated version of the application database largely independent of changes in the structure between the first and second databases.

One aspect of the invention provides a method for migrating contents of a database. The method includes serializing objects from information the retrieved from a first database and then deserializing the serialized objects to recover information retrieved from the first database and to restore the recovered information in a second database.

Another aspect of the invention provides a method operable in a workflow processing system having a database containing base information generated by the workflow processing system and containing user information generated by a user of the workflow system. The method provides for migrating information in the database to a second database in conjunction with a corresponding update to programmed instructions of the workflow processing system. The method includes serializing information from a current version of the database as serialized objects in a serialized data file. The method then updates programmed instructions of the workflow processing system. Next, the method generates a new version of the database populated with base information in accordance with structure supported by the updated program instructions. The method then includes deserializing, using the updated program instructions, the serialized objects in the serialized data file to merge information from original version of the database into the new version of the database. Lastly, the method includes removing unused information in the new version of the database.

The invention may include other exemplary embodiments described below.

DESCRIPTION OF THE DRAWINGS

The same reference number represents the same element on all drawings.

FIGS. 2-5 are flowcharts describing exemplary methods in accordance with features and aspects hereof to provide for database migration in conjunction with application code updates by using serialization and deserialization of the database information content.

DETAILED DESCRIPTION OF THE INVENTION

FIGS. 1-10 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
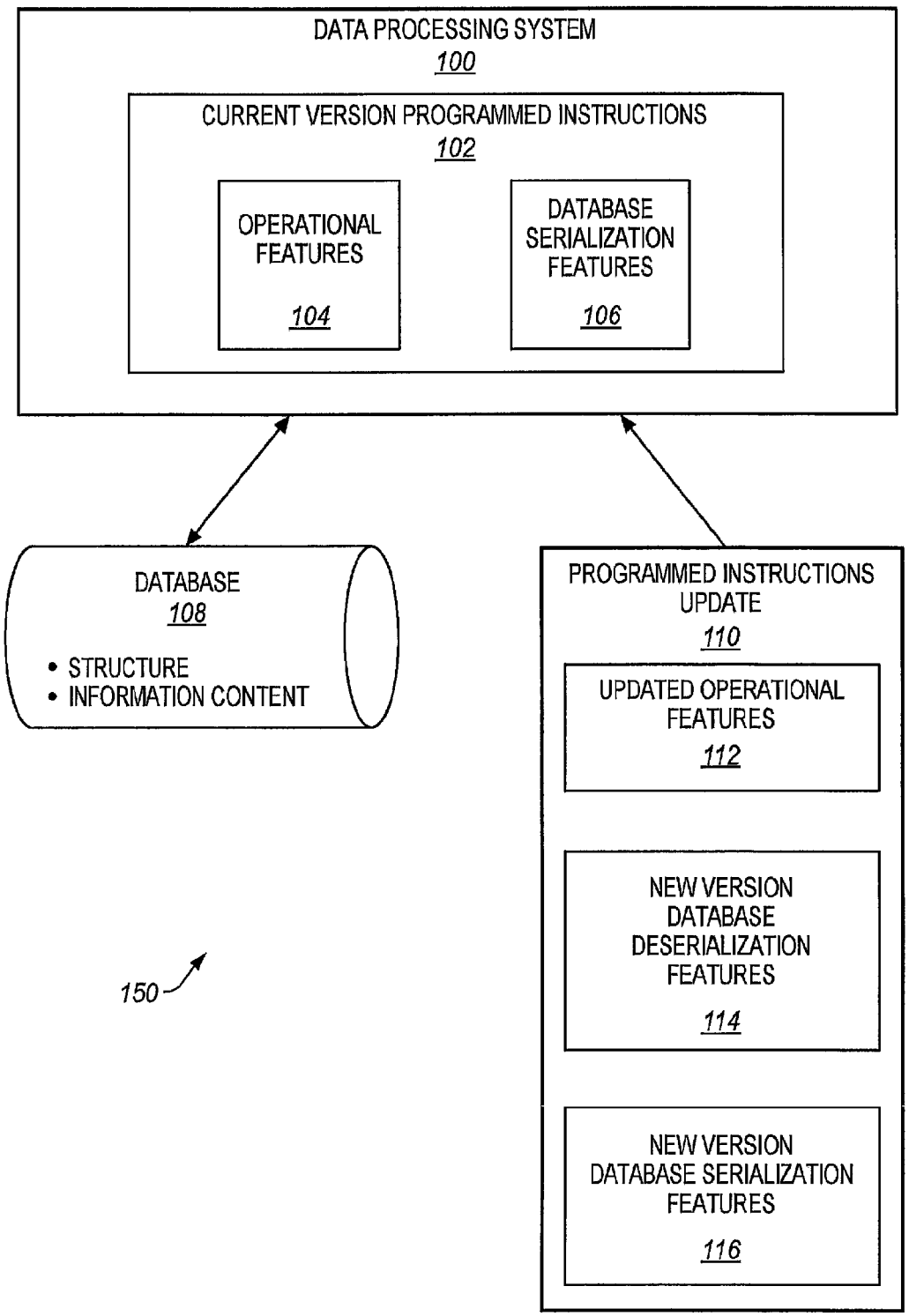
FIG. 1 is a block diagram of an exemplary system embodying features and aspects hereof to improve migration of an application database in conjunction with update to the application programmed instructions by using serialization and deserialization of the database information content.

FIG. 1 is a block diagram of a system 150 embodying features and aspects hereof to utilize serialization and deserialization to migrate a database from its current version to a new version. Data processing system 100 may be any suitable computing node or network of distributed computing nodes. For example, data processing system 100 may be a distributed workflow processing system embodying any number of computing nodes serving the needs of clients of the workflow processing system. The workflow processing system may be as described in the sibling patent application in that it may be flexibly configurable by a user and may be applied, for example, to control and processing or print jobs in a printing environment.

Operable within the data processing system 100 is a current version of programmed instructions 102. As noted, the programmed instructions may implement workflow processing features or other applications. Operational features 104 exemplify programmed instructions and associated data useful for performing the desired application. As noted above, where such an application utilizes a database 108, the database may incorporate structure and information content some of which is defined by the application system while other content and/or structure may be defined by the user of such an application system. For example, in the context of a workflow processing system, the workflow processing system, per se, may define various structures and associated information content for workflow models used for processing particular jobs in accordance with associated workflow models. The workflow models may be defined and stored as entries in database 108. Further, other information in the database 108 may represent specific information regarding particular jobs as defined by users of the application system. Thus, database 108 in such an exemplary embodiment may incorporate standardized or base structure and content as well as user modified or user-defined structure and content. In addition, data processing system 100 may include extension features within the programmed instructions 102. Thus, operational features 104 may incorporate standard features of the system as well as optional, extension features. Thus, database 108 may also incorporate base structure and information content defined by the application system as well as extension related structure and information content defined by optional features of the data processing system 100.

As noted above, such data processing systems 100 often have a tightly integrated database 108 including structure and information content related to base features, extended features, and user-defined information and structure. This dynamic, changing content and structure gives rise to numerous problems in updating the system. An update to the data processing system may incorporate updated programmed instructions as well as updated structure and information content for the integrated database. Where the current version of the database includes base features as well as extended features in addition to user customized information, update of the database to include revised base features, extended features, or new features can be problematic.

In accordance with features and aspects hereof, the current version of programmed instructions 102 in data processing system 100 may include database serialization features 106. Database serialization features 106 are operable to create serialized objects fully describing information content within database 108. The serialized objects may be stored in a file structure ready for deserialization by an appropriate update to data processing system 100. Programmed instructions update 110 is exemplary of such an update for data processing system 100. Update 110 may include updated operational features 112 representing programmed instructions and associated data for updating operational features 104 of the data processing system 100. In addition, programmed instructions update 110 includes a deserialization feature 114 for deserializing the serialized objects from the current database for purposes of updating a new version of the database with any modified, customized, or user-defined information content previously generated in the current database 108. Thus, when successfully updated with programmed instructions update 110, data processing system 100 will have an operational component to reconfigure contents of database 108 with appropriate updated base and extended features and will include programmed instructions for deserializing the serialized objects information file generated by the serialization feature 106 prior to the update process. In addition, programmed instructions update 110 may also include an updated version of the database serialization feature 116 to supplant the current version serialization feature 106. Thus, upon completion of the update processing, data processing system 100 will be operable with a new version of the database, new operational features, and will include an appropriately updated serialization feature for subsequent update processing.

Those of ordinary skill in the art will readily recognize that system 150 of FIG. 1 is intended merely as an exemplary embodiment of features and aspects hereof. In particular, database 108 may be centralized in its coupling to a single data processing system 100 or may be configured such that the storage capacity for database 108 is distributed over a storage area network or other network storage architectures. Still further, as noted above, data processing system 100 may represent either a single computing node or a distributed network of multiple computing nodes operable to service the needs of any number of client processes. Such centralized versus distributed computing paradigms are well known to those of ordinary skill as a simple matter of design choice. Still further, programmed instructions update 110 may be provided to data processing system 100 by any suitable medium. For example, the program instructions update may be provided to data processing system 100 as any form of computer-readable medium including the, for example, magnetic or optical storage media as well as network file transmissions. Still further, those of ordinary skill in the art will understand that data processing system 100 may include any suitable user interface components (not shown) and associated instructions and data. Such user interface components may be utilized to interact with an administrative user responsible for successfully completing the update of data processing system 100.

FIG. 2 is a flowchart broadly describing a method in accordance with features and aspects hereof to utilize the serialization techniques for migrating information from the first database to a second database. Such migration may be useful, for example, to update the database in conjunction with a corresponding update to programmed instructions and data. Thus, information may be migrated from the first database having current structure and information content to a second database representing a new or updated version of the integrated database. The updated second database may therefore include standard, original base and extension features and updated, customized information from the serialized information in the first database. Thus, element 200 is first operable to serialize information in a first database to thereby generate a file of serialized objects. The underlying database may be an object oriented database ("ODBMS") or may be any other form of database including information and structure representing relationships between elements of the stored information (e.g., relational database management systems, hierarchical database management systems, etc.).

The serialized objects file generated by the operation of element 200 therefore represents the current information content of the first database encoded as a sequence of serialized objects. Element 202 is then operable to deserialize the serialized object file created by operation of element 200. The information determined by the deserialization is then added to a second database. As noted above, the second database may be an initialized new version of the first database that may include structure and information changes inherent in associated program instruction updates. Such a new version of the database may include standard structure and information content associated with base features of the associated application and with any enabled extension features of the underlying application. However, modified structure and information content from the first database based on user modifications or user application data must be integrated or merged into such a new version. Thus the serialized objects of the first database (e.g., an older or current version) are merged with the standard base features in the newly initialized second database (e.g., new version of the database corresponding to updated programmed instructions).

FIG. 3 is a flowchart describing an exemplary method in accordance with features and aspects hereof to utilized serializing and deserializing features in migrating information from a current version of a database to a new version of the database. As above, such a database may be tightly integrated with program features of an underlying application system. Thus an update to the programmed instructions for the underlying application may also entail an update to base feature structures and information content in the tightly integrated database. However, modifications and user content and information structure and information content in the current or old version of the database must be migrated or merged into the updated, new version of the database.

Element 300 is first operable to serialize all information in the current version of the database to thereby generate a serialized objects file. As noted above, the underlying current version of the database may be an object oriented database ("ODBMS"), a relational database ("RDBMS"), a hierarchical database, or any well-known form of database structure. The information content of that current database is represented as the serialized objects in the serialized objects file. The serialized objects file may be stored in any appropriate memory associated with a computing node performing the method of FIG. 3 including, for example, the storage medium on which the current database resides. Element 302 is next operable to complete the update of programmed instructions for the underlying application system. As noted above, the updated program instructions may include appropriate programmed instructions and data for performing the serialization of the serialized objects file created by operation of element 300.

Element 304 is then operable utilizing the updated programmed instructions to create a new version of the integrated database for the underlying application. The current version of the database may be left intact until after all processing has completed to generate and update a new version of the database. Such a precautionary measure to assure a working backup copy of the database is well known to those of ordinary skill in the art. The newly created version of the database is initially populated with structure and information content associated with base features of the updated underlying application system as well as any selected extension or optional features thereof. The serialized objects file the represents information from the original or current database that requires merging into the newly updated structure of the database. The differences between the current and new database structures and information content may be resolved by merging information from the serialized objects file. In addition, data customized or generated by operation of the underlying application system may also be merged into the new newly populated updated version of the database.

Element 306 therefore represents processing to deserialize objects in the serialized objects file and to merge any information derived therefrom into the new version of the database. Included in such deserialization features may be rules and other program instruction sequences for determining how to best merge the content of the current database as represented in the serialized objects file into the new version of the database. Thus, element 306 merges all differences between the current and new database content to incorporate user data from the current database into the newly populated, initialized new version of the database. In addition, any differences between the structure and information associated with base features or with enabled extension features between the current and new version of the underlying application program instructions may also be resolved by the processing of element 306.

Lastly, following the deserialization of objects in the serialized object file and the associated merging of any differences, element 308 is operable to remove any unused information content in the updated, new version of the database. Underlying structural differences associated with changes in the methods of the underlying application program may cause certain object types or data to become unused and thus removable from the database. The information content may become unused in the new version of the database because of corresponding changes in the updated programmed instructions of the underlying application system. As discussed further herein below, the order in which serialized objects are deserialized is relevant to defining new objects before other objects that depend from the earlier objects. For similar reasons, the processing of this element 308 to remove unused object types or information may review objects in the reverse order to identify objects or object types that may be safely removed. In other words, hierarchically lower elements in the updated, new database are inspected to identify those that are unused by any hierarchically higher objects. The removal processing then iterates through hierarchically higher level objects until all unused objects have been removed.

Figure 4:
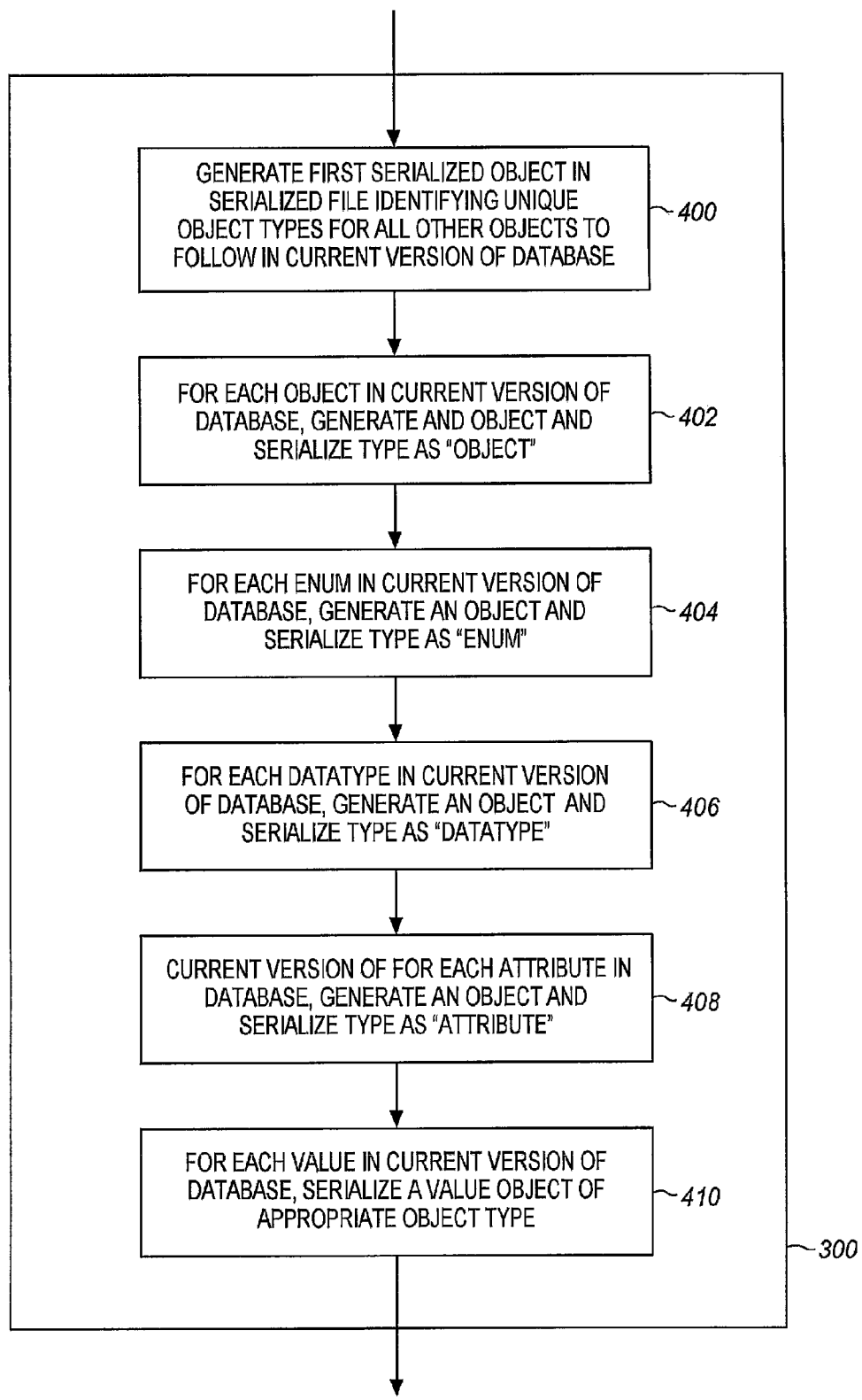
Figure 5:
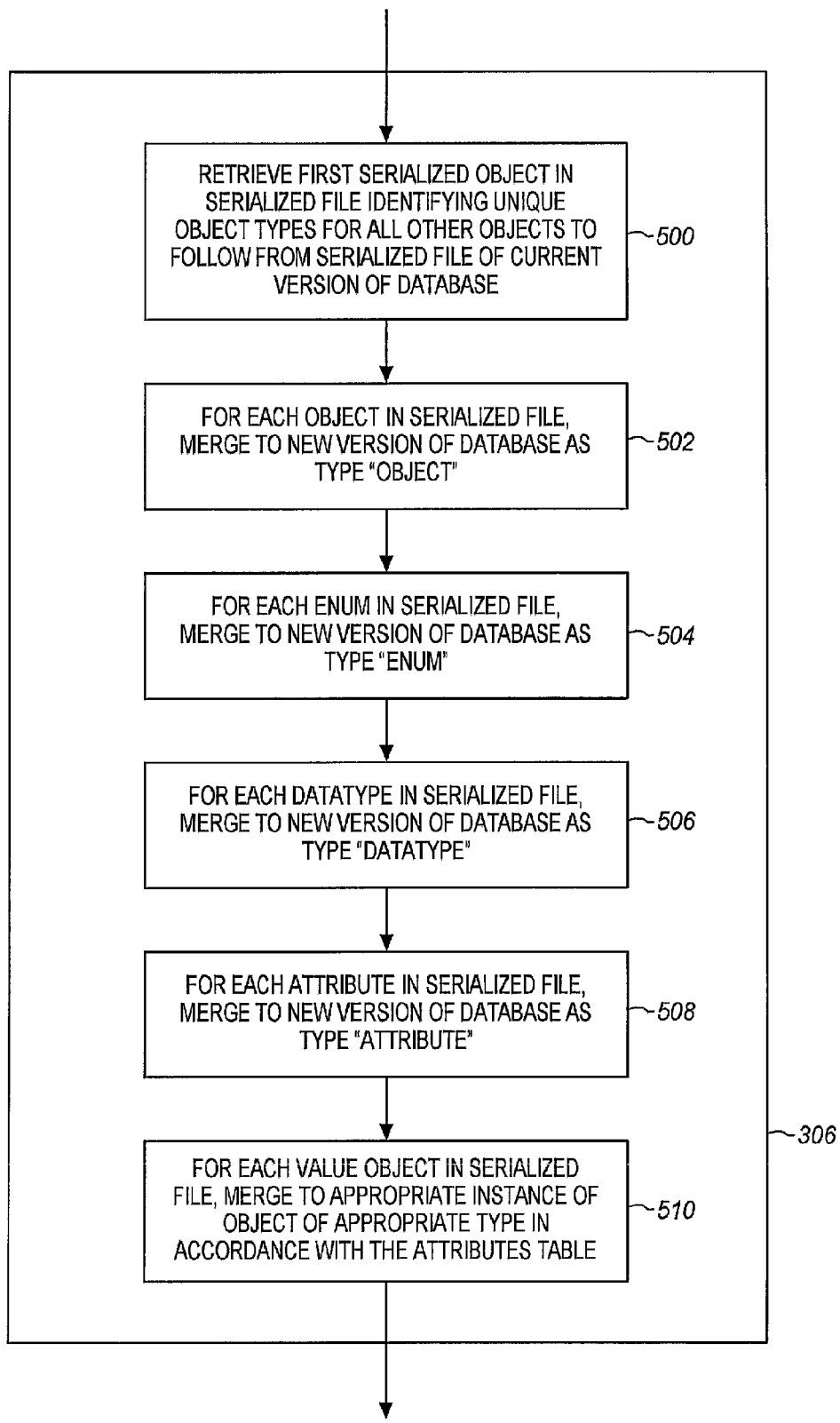

FIGS. 4 and 5 discuss exemplary additional details of the serialization and deserialization processing as applied to a particular exemplary application. More specifically, FIGS. 4 and 5 relate to serialization and deserialization of a hierarchy of object types for an exemplary integrated database in an underlying workflow processing system. Object types that may describe a typical data types for such an exemplary application database may include "object types", "enum types", "datatype types", and "attribute types".

FIG. 4 is a flowchart providing exemplary additional details of the processing of element 300 of FIG. 3. As noted above, element 300 of FIG. 3 is operable to generate the serialized objects file by serializing information content from the current version of the database. It is important that the information serialized from the current database be later deserialized in an order that assures all the references are defined in a hierarchically correct manner—e.g., from structurally higher types of serialized objects to lower level serialized objects. Thus, the flowchart of FIG. 4 provides exemplary details of a preferred order of processing to generate the serialized objects a file. In particular, element 400 is first operable to generate a first serialized object to be stored in the serialized objects file. The first serialized object is an "object types" object that serves to identify the object types for all subsequent objects yet to be serialized from the information content of the current version of the database. The "object types" object informs the deserializing component of all the types of objects yet to come in subsequent serialized objects of the serialized objects file. This information may be valuable in that the serialization process and deserialization process should preferably operate in the same order such that all objects attributes and other features of the database can be properly recorded and restored in the migration process. Those of ordinary skill in the art will readily recognize a variety of options to assure that the serialized objects are deserialized in the proper order.

Elements 402 through 410 are then operable to serialize a series of objects into the serialized objects file—each representing a type of object (e.g., a class of objects and/or attributes or characteristics of objects). The particular types or classes of objects that may be generated in the serialized objects file are dependent upon the particular structure of the underlying application database to be described by the serialized objects. For example, a workflow processing system database applied in a printing environment may include object types that represent a variety of objects in a printing environment—print jobs, printers, spoolers, post processing devices, etc. There may thus be some number of objects that represent these various components—often encoded as tables in the application database. Other object types may be encoded that represent data types of the data values associated with each type of object. Still other object types may be serialized to represent attributes associated with each type of object. Still other common encodings may be objects representing "enum" types within the current database content. Those of ordinary skill in the art will recognize a wide variety of object types that may be created as serialized objects to represent the information and data types of the application database. Still further, in addition to the various object types that represent the type of information of the current version or next version application database, value objects may be created and serialized to represent values of specific instances of the various object types.

One exemplary embodiment useful for encoding serialized objects representing information content of a database in a workflow processing system applied to printing environment may encode the database content as serialized objects of type "object", followed by objects of type "enum", followed by objects of type "data types", followed by objects of type "attribute". Following these serialized objects representing the content of the database, value objects may be serialized to represent values of particular instances of particular objects of the above types. Thus the information content of the application database may be represented by serialized objects in the serialized objects file. The deserialization process may then merge the serialized information into a newly populated database with updated structure.

FIG. 5 is a flowchart describing exemplary additional details of the processing of element 306 of FIG. 3. As noted above, element 306 of FIG. 3 is operable to deserialize the information in the serialized objects a file to merge information from the current database version into the new, updated database version. As noted above, the deserialization process preferably retrieves and deserializes objects in the same order in which the objects were serialized as discussed above and FIG. 4. Those of ordinary skill will recognize that it need not be the same order as that of FIG. 4 so long as it is the proper order to define objects before they are referenced by other objects. To determine the types of objects to be deserialized from the serialized objects file, element 500 is first operable to retrieve the first serialized object that identifies all other object types to follow in the serialized objects file. Elements 502 through 510 are then operable to deserialize each of the various types of objects from the serialized object file. As above with respect to the order of FIG. 4 objects of type "object" followed by those of type "enum" and then "data types" and then "attributes" are intended merely as exemplary of object types that may describe one exemplary application database structure relating to print job processing. Other types of data may be represented for other specific applications of features and aspects hereof. Element 510 then represents processing of other types of value objects with values for specific instances of the other object types.

Thus, the sequence of serialization and deserialization exemplified by the detailed flowcharts of FIGS. 4 and 5 is intended merely as suggestive of one possible sequencing of the processing of object types and object values (together representing information content of the underlying database). Those of ordinary skill in the art will recognize other sequences involving other types of objects serialized and deserialized in the serialized objects file that achieves the same purpose of adding and merging information content from an old, current database to a new, updated database.

As noted above, the first serialized object in the serialized objects file is preferably an "object types" object that serves to identify the types of all objects that follow in the serialized objects file. In general the "object types" object is used to populate an object type table used by the serialization and deserialization code to identify the order in which objects are processed during serialization and deserialization and to identify new types of objects that have been added by user customization or extension features of the underlying application system. Thus, the first database or current version of the database may include additional object types or "rows" in the object types table representing object types that have been added by extensions to the base features of the underlying application system. When the new program instructions representing an update or upgrade are installed, the same extension features will be included in the updated program instructions and thus the additional object types must be recognized from the first or current version of the database to allow appropriate merging into the new version or second database.

Using the serialization and deserialization methods and structures described herein, a significant number of changes may be accommodated in the new version of the database. Data from the current version may be merged into the new version of the database. Structural changes in the new version of the database may include any of the following exemplary structural changes: addition or deletion of a row or column in an existing table, addition of a new table and its associated contents, changing parameters of a column in a table (e.g., size, data type, validity constraints, etc.), changing parameters of an existing table, etc. In addition, the deserialization process may include features to help a user in the migration process. For example, deserialization may include steps to validate any data in the tables, to backup/restore the database, to undo an earlier update, to highlight or report changes between current and new versions, etc. Further, those of ordinary skill in the art will recognize that depending on the nature of the updates, some changes may not be supportable. For example, where updates involve patches or fixes based on a particular release level some changes may be disallowed until a full release update. Such design choices are dependent upon the particular application of features and aspects hereof and the nature of updates in each particular application. In general, the above and other changes may be supported and may be allowed or disallowed at different levels or stages of the update processes unique to each application.

Figure 6:
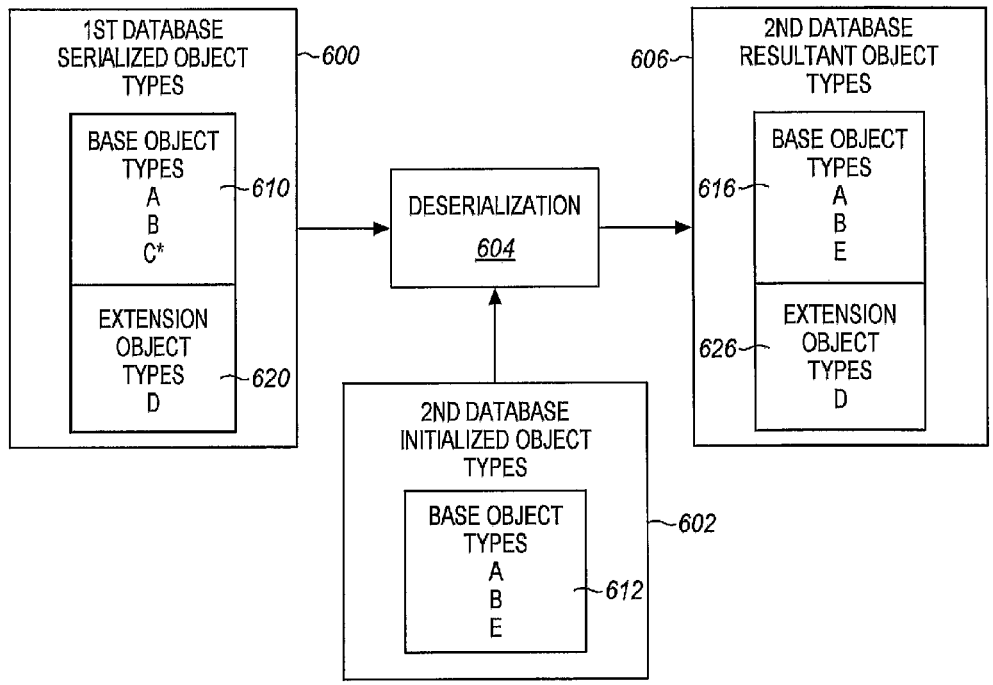
FIGS. 6 and 7 are block diagrams describing exemplary deserialization of object types representing the types of information of the migrating database in accordance with features and aspects hereof.

FIG. 6 is a block diagram representing the migration from the current version of the database (e.g., first database) to an updated version of the database (e.g., second database). The current database is represented by the serialized object types 600 representative of the object types serialized into the serialized objects table. The serialized objects from the first database may include base object types 610 including, for example, object types A, B, and C. Further, extended features utilized in the current database (e.g., first database) may include object type D represented as extension object types 620. By contrast, the new version of the database (second database) may include initial object types 602 including base object types 612 A, B, and E. Thus, types 602 reflect a change between the first and second database wherein base object type C has been eliminated or removed in conjunction with corresponding program instruction updates. Deserialization processing 604 would thus merge object types 600 from the current database with the initialized object types 602 from the second database to produce the second database resultant object types 606. The results represent the merge of the various base object types to add new base object type E and remove old base object type C. Thus the new base object types 616 include exemplary object types A, B, and E, with old base object type C being removed. In addition, extended object types 626 include the extension object type D present in the first database as reflected in the serialized objects file.

The deserialization process may be integrated as an aspect of the program instruction update associated with the migration of the database. The underlying application system code is upgraded by the update process and includes the deserialization method to process the serialized objects file. In general, the deserialization method may include rules for automating the migration of features that are different between the current version of the application database and the new version of the database. For example, in the context of print job workflow processing systems, features relating to duplexing (e.g., two sided printing) in a current version of the workflow processing system may simply indicate "yes" or "no" as an attribute representative of the print job's desire to be duplexed or simplexed (single sided printing). An updated version of such a workflow processing system may embellish the duplex features to include tumble duplex, non-tumble duplex, and simplex mode. Such an exemplary feature would then be migrated to a more complex feature representing all three options (e.g., simplex printing, duplex tumble printing, and duplex non-tumble printing). An appropriate rule for such an automated migration would preferably be encoded within the updated program instructions of the underlying application system. Further, by way of example, additional rules integrated within the deserialization code may specify ranges of values deemed to be valid for particular objects, attributes, etc. and other ranges deemed to be invalid. Where an invalid value is sensed in the migration process, a rule may specify an automated correction of such an invalid value or may specify that user interaction is to be utilized to manually correct an invalid value. Numerous other types of rules for validating the migration of information from the current version to a new version of the database will be readily apparent to those of ordinary skill and the art and are unique to each particular application of features and aspects hereof.

Figure 7:
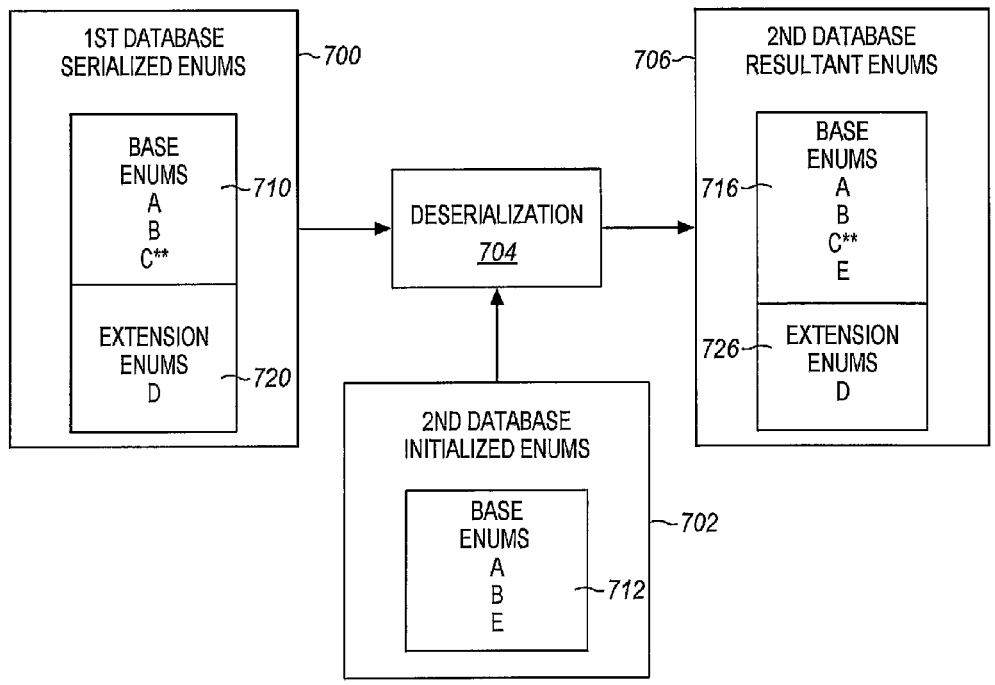

FIG. 7 is a diagram similar to FIG. 6 but describing an exemplary deserialization process when deserializing "enum" object types. Similar processing may be utilized for deserialization of other object types in the exemplary serialized objects file for update of a workflow processing system exemplary database. Such other object types may include, for example, "data types" object types and "attribute" object types. In these cases, potentially unused objects should be retained until the migration process is completed so as to avoid conflicts between new version types and old version types. For example, in FIG. 7, the serialized objects file representing the current database includes a number of serialized enum type objects 700. These objects may include base enum types 710 (e.g., specifying enum types of A, B, and C) and extension enum types 720 (e.g., specifying enum type D). By contrast, the second database as originally initialized prior to commencing deserialization includes a number of initialized enum types 702 including base enum types 712 (e.g., specifying enum types A, B, and E). Deserialization processing 704 then merges the differences to generate the updated new version of the database with resulting enum types 706. The results may include base enum types 716 (e.g., specifying enum types A, B, C, and E) as well as extension enum types 726 (e.g., specifying a new type D.). Though enum type C is no longer required (as indicated by the "**") it remains in the updated new version of the database until deserialization of all objects has been completed. The final step in the migration process as discussed above in FIG. 3 then removes all remaining unused objects in the updated new version of the database.

The deserialization processing may provide for initializing and updating an "attributes table" to aid in the merge processing when migrating a current database (first database) to a new version database (second database). The attributes table in general may be structured such that each row represents the initial attributes and parameters of each object type to be constructed in the new version of the database. The columns of each row may specify the various attributes and other parameters and characteristics of the corresponding object type. The attributes table may be initialized in the deserialization process to include all object types known in the base object types and extended object types of the current version and the new version of the database. One column in particular may provide a migration class entry used to specify how that object type should be migrated from current version of the database to the new version of the database. For example, the migration class entry may specify that the corresponding object type, used only in the current version, should be deleted in the new version since it is no longer required. Or, for example, the migration class for an entry may specify that the corresponding object type when encountered in deserializing the serialized object should be transformed in some manner to a new object type or simply a new value.

In addition to the initialized entries of the attributes table corresponding to known base or extended object types in both the current and new database, the table may be updated as customized (i.e., user defined) object types are encountered in deserializing the serialized objects file. As noted above, it is common that the integrated database of the application system may be updated during operation of the system to include wholly new objects and object types defined by a user of the system rather than by the underlying application system. As such customized objects and object types are encountered in deserialization, the attributes table may be updated to add a new entry for the customized, user defined object and/or object type.

As noted above, the deserialization process preferably proceeds through the serialized objects file in a predetermined order such that all object types and associated attributes are processed first and then the value objects (e.g., object instances) are deserialized. Thus the attributes table is initially constructed at the start of deserialization and is updated as the object types and attributes are processed in the serialized objects file. When the value objects are then processed the attributes table has been fully updated and is used to guide the actual migration for any value objects encountered in the serialized objects file. The attributes table essentially specifies how the value object should be transformed in accordance with the various attributes and value specified in the attributes table row corresponding to the object's type.

An exemplary attributes table may be provided as follows:

| Attr ID | Attr Name | Table Name | Table Column Name | Access Method | "datatype" | ... | "object type" | Migration Class |
|---------|-----------|------------|-------------------|---------------|------------|-----|---------------|-----------------|

The Attr ID, Attr Name, Table Name, Table Column Name all combine to indicate the attribute to which the row corresponds. The Access Method indicates how that attribute value is to be accessed in the corresponding table. The "datatype" and "object type" and other object types associated with the attribute serve to further identify the attributes which should utilize this row to guide their migration during deserialization. Lastly and most importantly, having precisely identified the attributes to which this row of the table should be applied, the Migration Class is an object used to migrate the corresponding value objects when encountered in the deserialization of the serialized objects file.

Figure 8:
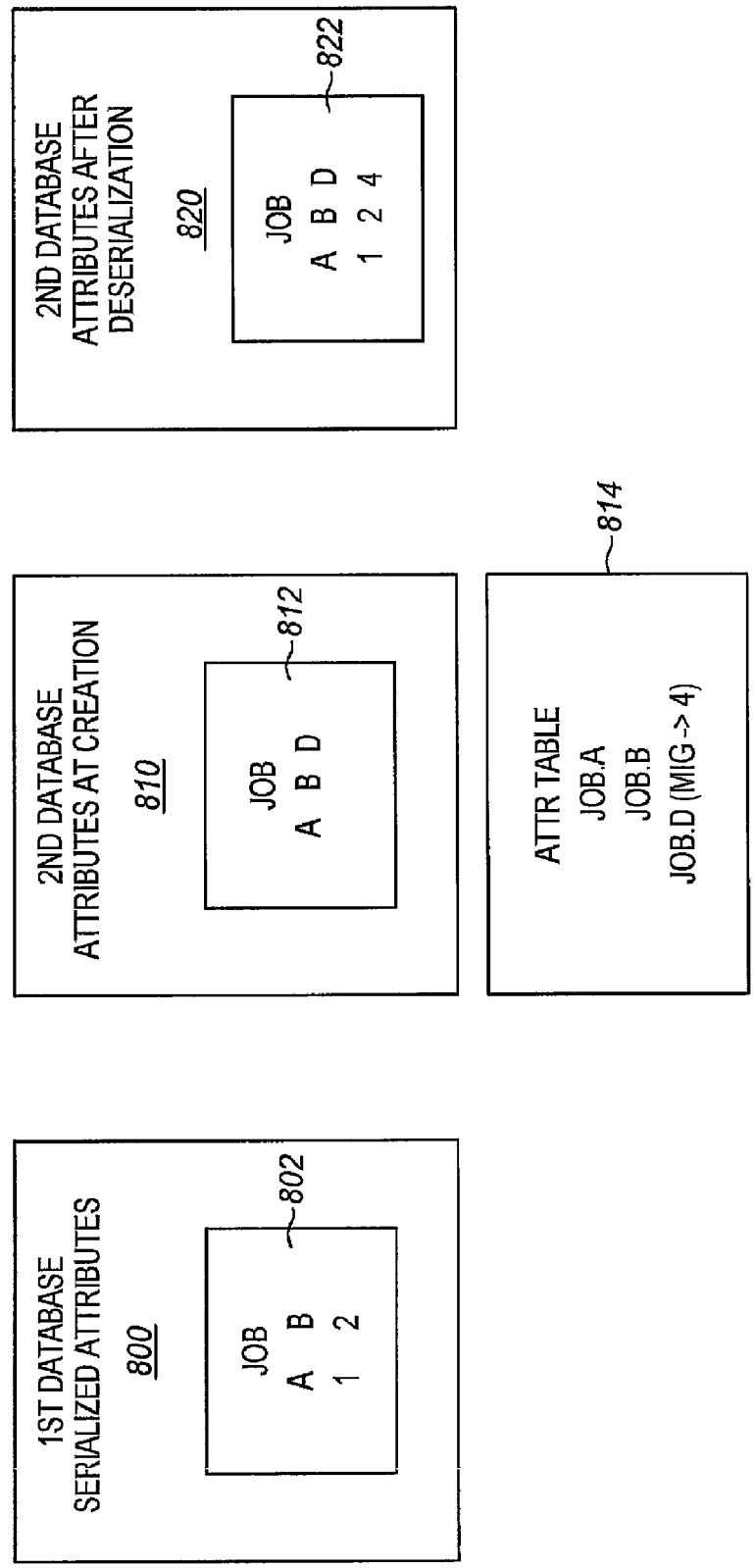
FIGS. 8 and 9 are block diagrams describing exemplary deserialization of value objects representing information content of the migrating database in accordance with features and aspects hereof.
Figure 9:
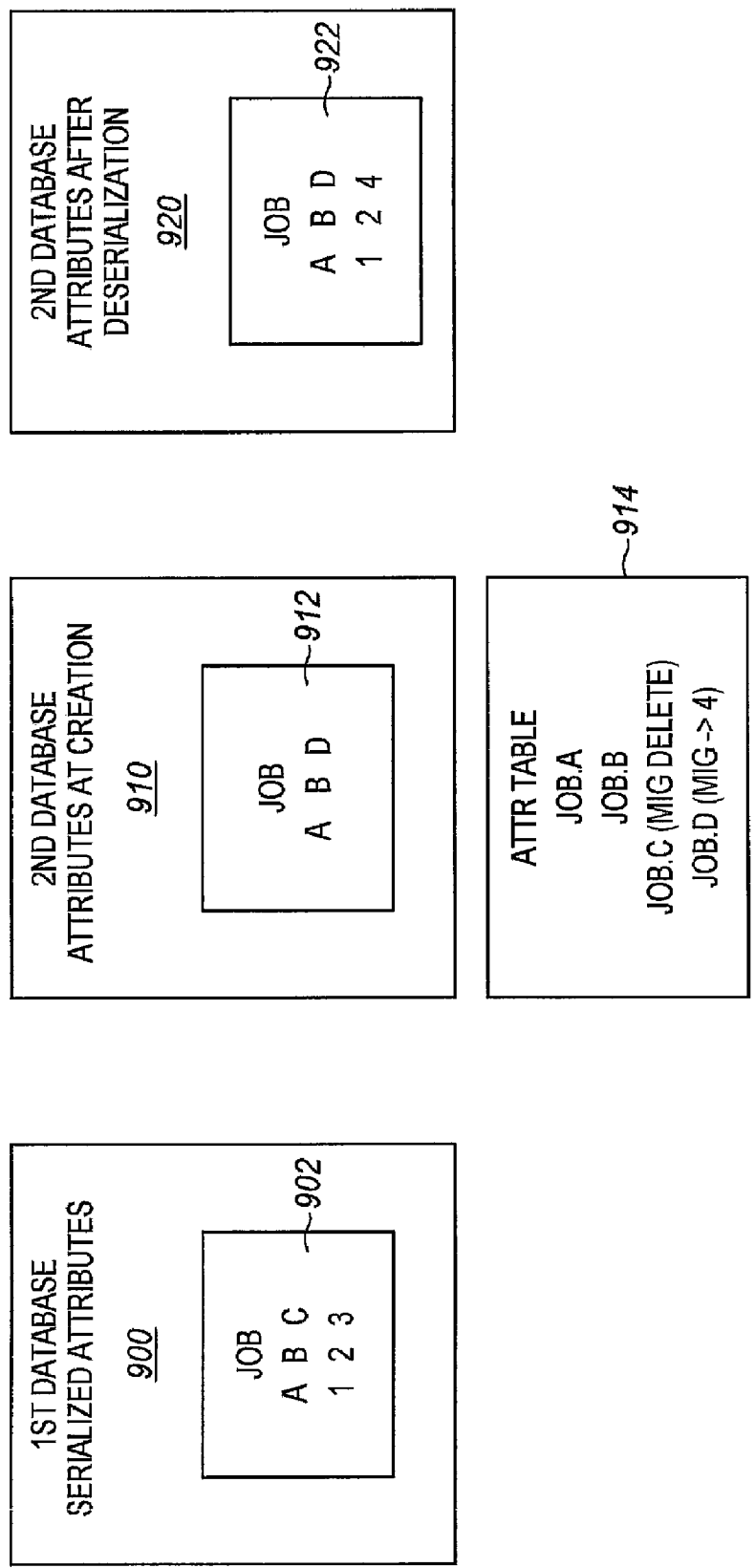

FIGS. 8 and 9 represent exemplary migrations of value objects in accordance with the information built up in the attributes table by deserialization of object types. In FIG. 8, a new attribute object "D" has been added and the migration class indicates that the object values are to be migrated to a new value (e.g., "4"). In particular, Serialized attributes (objects) 800 for the current database indicate two attributes of a "job" object 802—namely attributes "A" and "B" with attribute values "1" and "2", respectively. In the new version of the database at creation 810, all "job" objects include a third attribute "D". Thus "job" object 812 has three attributes "A", "B", and "D" though they have no migrated values yet. Attributes table 814 indicates that attribute types "Job.A" and "Job.B" are migrated without change while value objects of new attribute type "Job.D" are migrated to a new value of "4". Thus the new database after completion of deserialization 820 has "job" object 822 with three attributes with migrated attribute values—namely attribute "A" and "B" with unchanged migrated values of "1" and "2", respectively and includes a new "D" attribute "job" with a migrated attribute value of "4".

FIG. 9 shows serialized objects from the current database 900 with three attributes defined for "job" object 902 (attribute types "A", "B", and "C" having attribute values of "1", "2", and "3", respectively). For reasons in this updated application, attributes of type "C" are no longer required and a new attribute type "D" is defined for "job" objects. Hence, the new database at creation 910 has only two of the three original attribute types for "job" object 912 ("A" and "B") and adds a new attribute type "D" (all three without values at creation). The attributes table 914 at creation specifies migration of new attribute type "D" objects to a new value of "4" and indicates that attributes of type "C" should be migrated by deletion. When the value objects are deserialized, "C" job attributes are removed from the updated job object 922 in the updated new version of the database 920.

Figure 10:
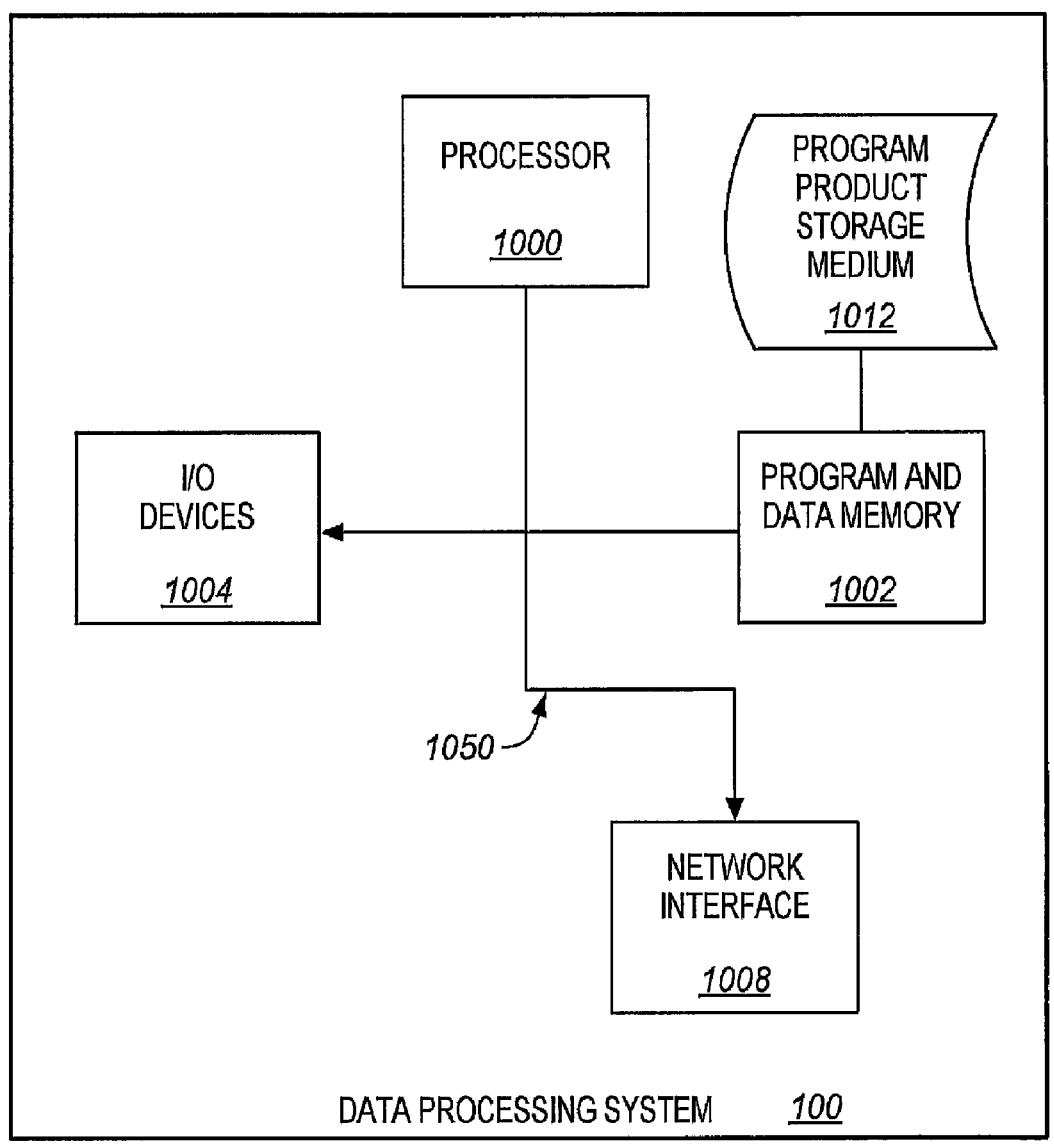
FIG. 10 is a block diagram of a system adapted to process computer readable medium embodying computer program products implementing methods in accordance with features and aspects hereof to migrate a database using serialization and deserialization techniques.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 10 is a block diagram depicting a data processing system 100 as a data processing device adapted to provide features and aspects hereof by executing programmed instructions and accessing data stored on a computer readable storage medium 1012.

Furthermore, the invention can take the form of a computer program product accessible from a computer-usable or computer-readable medium 1012 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1000 coupled directly or indirectly to memory elements 1002 through a system bus 1050. The memory elements can include local memory employed during actual execution of the program code, bulk storage, and cache memories which provide temporary storage of at least some program code in order to reduce the number of times code must be retrieved from bulk storage during execution.

Input/output or I/O devices 1004 (including but not limited to keyboards, displays, pointing devices, etc.) can be coupled to the system either directly or through intervening I/O controllers. Network adapter interfaces 1006 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A computer implemented method for migrating contents of a database, the method comprising:
   generating in a serialized objects file an object types serialized object including information on object types of objects in a first database in at least one of a plurality of storages, wherein the object types serialized object having information on the object types indicates an order of the object types in the first database in which the objects in the first database are to be serialized and deserialized in the serialized objects file;
   generating in the serialized objects file serialized objects describing information content of objects in the first database according to the order of the object types indicated in the object types serialized object; and
   deserializing the serialized objects in the serialized objects file according to the order of the object types indicated in the object types serialized object to recover information retrieved from the first database and to restore and merge the recovered information in the serialized objects in objects in a second database in the at least one of the plurality of storages, wherein a structure of the second database is different from a structure of the first database.

2. The method of claim 1, wherein the serializing is performed by execution of a first version of programmed instructions, wherein the method further comprises:
   updating the programmed instructions from the first version to a second version,
   wherein the step of deserializing is performed by execution of the second version of the programmed instructions.

3. The method of claim 2,
   wherein the deserializing further comprises converting deserialized objects for storage in the second database in accordance with the different structures of the first and second database.

4. The method of claim 3, wherein converting further comprises:
   detecting a change in the deserialized object with respect to the different structures of the first and second databases; and
   changing the second database in accordance with the detected change wherein the change to the second database is a change selected from the group consisting of:
     adding a row to an existing table;
     adding a column to an existing table;
     adding a table;
     deleting a row to an existing table;
     deleting a column to an existing table;
     deleting a table;
     changing attributes associated with an existing column of an existing table; and
     changing attributes of an existing table.

5. The method of claim 1,
   wherein the generating of the object types serialized object including information on the object type comprises serializing a first object that describes all object types for all objects to be serialized from the first database,
   wherein the second database includes a base set of object types, and
   wherein the deserializing further comprises:
     deserializing the first object that describes all object types for all serialized objects from the first database; and
     merging the base set of object types for the second database with all the object types for all serialized objects from the first database to determine new object types for the second database prior to deserializing all other serialized objects from the first database.

6. The method of claim 5 wherein the object types include: objects, enums, data types, and attributes.

7. The method of claim 1 further comprising:
   removing any unused information restored to the second database from the deserialized objects in response to completion of the step of deserializing.

8. The method of claim 1, wherein the step of serializing further comprises:
   appending value objects to the serialized objects file representing the value of instances of the object types earlier defined in the serialized objects file.

9. The method of claim 8 wherein the deserializing further comprises:
   generating an attributes table indicating a migration technique for each object type known in the first database as indicated by the object types serialized object in the serialized objects file and indicating a migration technique for each new object type known in the second database; and
   deserializing the value objects in the serialized objects file in accordance with the migration techniques indicated in the attributes table.

10. The method of claim 1, further comprising:
    generating an object type table during serialization and deserialization that identifies an order in which the objects are processed during serialization and deserialization.

11. A computer implemented method for migrating information in a database in a workflow processing system in at least one of a plurality of storages, wherein the database contains base information generated by the workflow processing system and user information generated by a user of the workflow processing system, to a second database in conjunction with a corresponding update to programmed instructions of the workflow processing system, the method comprising:

serializing information from a current version of the database as serialized objects in a serialized data file by generating a serialized object types serialized object including information on object types of objects in a first database, wherein the object types serialized object having information on the object types indicates an order of the object types in the first database in which the objects in the first database are to be serialized and deserialized in the serialized data file and generating serialized objects describing information content of objects in the first database according to the order of the object types indicated in the object types serialized object;

updating programmed instructions of the workflow processing system;

generating a new version of the database populated with base information in accordance with structure supported by the updated program instructions;

deserializing, using the updated program instructions, the serialized objects in the serialized data file according to the order of the object types indicated in the object types serialized object to merge information from the current version of the database into the new version of the database; and removing unused information in the new version of the database.

12. The method of claim 11, wherein the step of serializing further comprises associating an object type with each serialized object in the serialized data file.

13. The method of claim 11, wherein the step of serializing further comprises:

generating a first serialized object that describes the object types of all other serialized objects in the serialized data file; and generating all other serialized objects in the serialized data file wherein each other serialized object is associated with an object type selected from the group consisting of: objects, enums, data types, and attributes.

14. The method of claim 11, wherein the current version of the database includes elements of information associated with base features of the workflow processing system and includes elements of information associated with extensions beyond the base features, wherein the new version of the database includes only elements of information associated with base features of the updated programmed instructions of the workflow processing system, and wherein the step of serializing further comprises associating an object type with each serialized object in the serialized data file, and wherein the step of deserializing is effective to concatenate object types for elements of information associated with extensions beyond base features into the new version of the database.

15. The method of claim 11, further comprising:

generating an object type table during serialization and deserialization that identifies an order in which the objects are processed during serialization and deserialization.

16. A computer readable storage medium having a computer program product executed by a processor to migrate contents of a database and perform operations, the operations comprising:

generating in a serialized objects file an objects type serialized object including information on object types of objects in a first database, wherein the objects type serialized object having information on the object types indicates an order of the object types in the first database in which the objects in the first database are to be serialized and deserialized in the serialized objects file;

generating in the serialized objects file serialized objects describing information content of objects in the first database according to the order of the object types indicated in the object types serialized object; and deserializing the serialized objects in the serialized objects file according to the order of the object types indicated in the object types serialized object to recover information retrieved from the first database and to restore and merge the recovered information in the serialized objects in objects in a second database, wherein a structure of the second database is different from a structure of the first database.

17. The computer readable storage medium of claim 16, wherein the serializing is performed by execution of a first version of programmed instructions, wherein the operations further comprises:

updating the programmed instructions from the first version to a second version, wherein the deserializing is performed by execution of the second version of the programmed instructions.

18. The computer readable storage medium of claim 17, wherein the deserializing further comprises converting deserialized objects for storage in the second database in accordance with the different structures of the first and second databases.

19. The computer readable storage medium of claim 18, wherein the converting further comprises:

detecting a change in the deserialized object with respect to the different structures of the first and second databases; and changing the second database in accordance with the detected change wherein the change to the second database is a change selected from the group consisting of:

adding a row to an existing table;

adding a column to an existing table;

adding a table;

deleting a row to an existing table;

deleting a column to an existing table;

deleting a table;

changing attributes associated with an existing column of an existing table; and changing attributes of an existing table.

20. The computer readable storage medium of claim 16, wherein the operations further comprise:

generating an object type table during serialization and deserialization that identifies an order in which the objects are processed during serialization and deserialization.

21. A system, comprising:

a processor;

a first database;

a computer readable storage medium having a computer program product executed by the processor to migrate contents of the first database and perform operations, the operations comprising:

generating in a serialized objects file an object types serialized object including information on object types of objects in a first database, wherein the objects type serialized object having information on the object types indicates an order of the object types in the first database in which the objects in the first database are to be serialized and deserialized in the serialized objects file;

generating in the serialized objects file serialized objects describing information content of objects in the first database according to the order of the object types indicated in the object types serialized object; and deserializing the serialized objects in the serialized objects file according to the order of the object types indicated in the object types serialized object to recover information retrieved from the first database and to restore and merge the recovered information in the serialized objects in objects in a second database, wherein a structure of the second database is different from a structure of the first database.

22. The system of claim 21, wherein the serializing is performed by execution of a first version of programmed instructions, wherein the operations further comprises:

updating the programmed instructions from the first version to a second version, wherein the deserializing is performed by execution of the second version of the programmed instructions.

23. The system of claim 22, wherein the deserializing further comprises converting deserialized objects for storage in the second database in accordance with the different structures of the first and second databases.

24. The system of claim 23, wherein the converting further comprises:

detecting a change in the deserialized object with respect to the different structures of the first and second databases; and changing the second database in accordance with the detected change wherein the change to the second database is a change selected from the group consisting of:
adding a row to an existing table;
adding a column to an existing table;
adding a table;
deleting a row to an existing table;
deleting a column to an existing table;
deleting a table;
changing attributes associated with an existing column of an existing table; and
changing attributes of an existing table.

25. The system of claim 21, wherein the operations further comprises:

generating an object type table during serialization and deserialization that identifies an order in which the objects are processed during serialization and deserialization.

* * * * *